Patented May 17, 1949

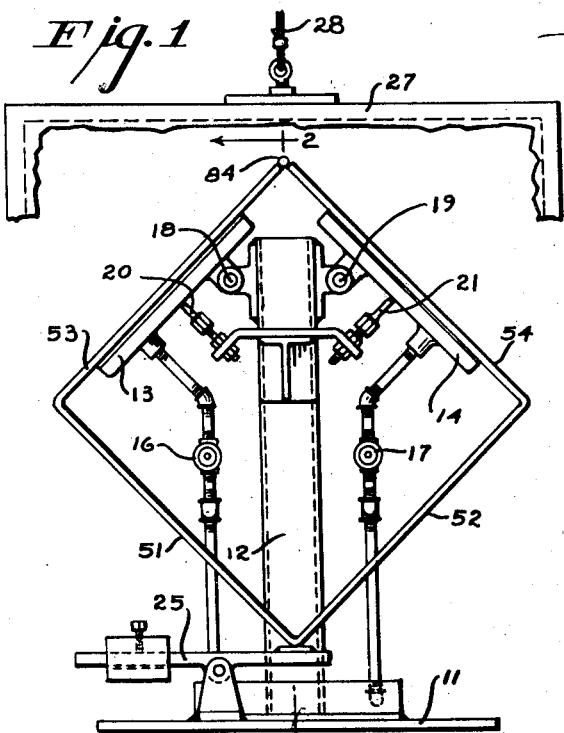
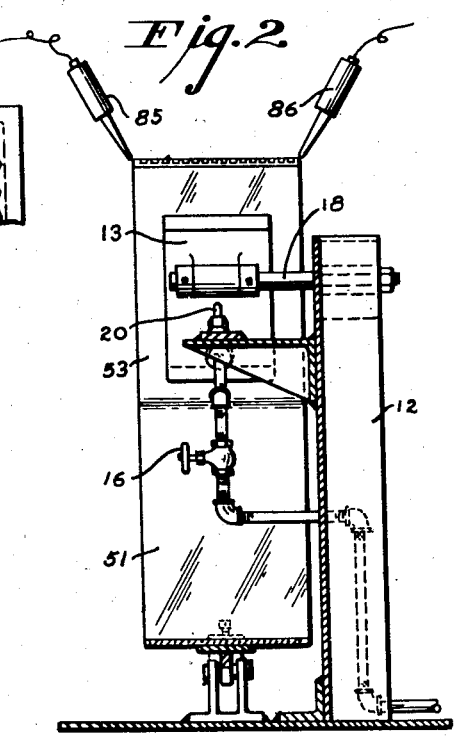
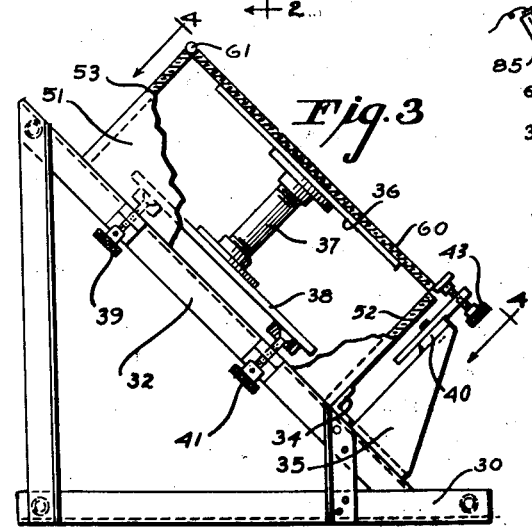
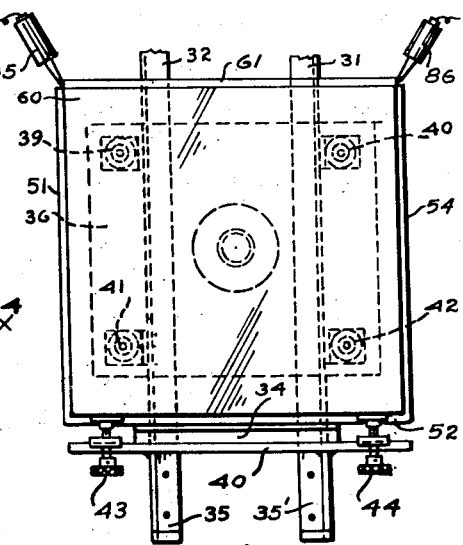

2,470,376

UNITED STATES PATENT OFFICE 2,470,376

METHOD OF WELDING GLASS

Morton R. Shaw, Jr., Corning, N. Y., assignor to Corning Glass Works, Corning, N. Y., a corporation of New York Application March 6, 1945, Serial No. 581,225

9 Claims. (Cl. 49—82)

The present invention relates to methods for the electrical heating of glass to temperatures proper for manipulation and fusion in which heat is generated in the glass itself by its resistance to the flow of an electric current.

One object of the invention is improved methods of heating especially suitable for the fusing together of glass parts, readily made by conventional glass working methods, to form glass articles of mass or shape characteristics rendering their manufacture by conventional methods impracticable.

Another object is an improved method of heating glass along a selected path.

By way of example, the invention as herein embodied is applied to the manufacture of glass tanks from sheets or panels of glass held in edge-to-edge relation at desired angles with respect to one another and to the welding of parts lying in the same plane in edge-to-edge relation.

In the accompanying drawing—

Fig. 1 is an end elevation of an apparatus supporting the side walls of a glass tank in position for welding the last two adjoining edges to one another and with a piece of cane, used in the welding operation, in place. Fig. 1 also shows a fragment of an enclosing preheating furnace.

Fig. 2 is a sectional view taken on line 2—2 of Fig. 1, but with the preheating furnace omitted and a pair of electrodes added and arranged in position to feed welding current through the cane.

Fig. 3 is an end elevation, of a fixture supporting a tank side wall assembly with a bottom wall in position preparatory to welding it to a side wall, the side walls and bottom being shown partly in section.

Fig. 4 is a view taken on line 4—4 of Fig. 3.

Fig. 5 is a sectional elevation showing a support on which are arranged two adjoining beveled edges of glass parts with a partly coated welding rod in position preparatory to welding the two parts together.

Fig. 6 is a side view of a length of welding rod or cane having a row of closely spaced conductive coatings arranged thereon.

In the apparatus of Figs. 1 and 2, 11 is a base supporting an upright 12. Upright 12 carries sheet or wall supporting vacuum chucks 13 and 14 connected to a vacuum line via suitable valves 16 and 17. For enabling close adjustment of the desired angular relation of chucks 13 and 14, they are pivoted about axles 18 and 19 and rest in the desired positions against adjustable stops 20 and 21. A weighted lever 25 is arranged to counteract the weight of a side wall or side walls of a tank having two other side walls supported in juxtaposed edge-to-edge relation on chucks 13 and 14, so that danger of warping or breaking of an otherwise suspended wall is reduced to a minimum, as will be more fully brought out later. The furnace 27 is of any conventional beehive type, preferably electrically heated, and suspended from a cable 28 which enables lowering of the furnace down over the equipment of Fig. 1 or Fig. 3. The tank wall structure, illustrated in Fig. 1, comprises side walls 51—54 and shows the adjoining edges of walls 53 and 54 remaining to be welded to one another.

The apparatus of Figs. 3 and 4 comprises a frame 30 having supporting rails 31 and 32 at a 45° angle and a transverse rail 34 for supporting a side wall assembly of a glass tank in position for welding a bottom wall thereto. The bottom wall support comprises a platen 36 mounted on a post 37 attached to a plate 38 supported on adjusting screws 39—42 carried by brackets welded to rails 31 and 32. A transverse bar 40, carried by supports 35 and 35' attached to rails 31 and 32, is provided with adjustable stops 43 and 44 for engagement with the lower edge of a bottom wall 60 arranged on platen 36. The structure of Figs. 3 and 4 is shown with the assembled walls 51—54 arranged thereon, a bottom wall 60 held in the desired relation for welding to walls 51—54 by support 36 and stops 43, 44, and with a piece of cane 61 in the V formed by the adjoining edges of walls 53 and 60.

Fig. 5 illustrates on an enlarged scale two glass parts 71 and 72 arranged on a non-electrical conducting slab 75 of refractory material preparatory to welding them to one another. A V-like cavity, comparable to that formed between the adjoining edges of the tank walls, is produced by beveling the adjoining edges of parts 71 and 72 and contains a welding rod 73.

A glass rod, having a continuous conductive coating of colloidal graphite along its length comparable to that disclosed in co-pending Guyer et al. application Serial No. 438,036 filed April 7, 1942, on which Patent No. 2,389,360 was issued Nov. 20, 1945, and owned by the assignee of the present application, may be employed. Preferably, however, the rod has a row of conductive coated portions 74 slightly spaced from one another extending approximately halfway around the rod as illustrated in Fig. 5, and along the entire length thereof as illustrated in Figs. 2 and 6.

Operation

In the manufacture of a glass tank two sheets or walls of glass, 51 and 53 for example, are arranged on chucks 13 and 14 in the relation in which sheets 53 and 54 are shown and are held in place by the vacuum chucks. Suspended preheating furnace 27 is then lowered down over the assembly and the sheets heated to a temperature depending upon the character of glass being used. The preheating of the sheets is done to prevent breakage by thermal shock during or shortly after the welding operation and is well below the softening temperature of the glass.

After preheating, the furnace is raised and a piece of cane 84 with a conductive coating or, preferably, a piece of cane such as 73 having a series of coatings over an arcuate surface thereof, is placed in the V formed at the juncture of the two sheets and a suitable potential applied to the ends of the cane by electrodes 85 and 86 to first burn off the conductive coating or coatings, as the case may be, and then continue by the Joule effect to heat the cane until it flows into the V, forming a perfect seal between the two walls or sheets, as shown at the juncture of sheets 53, and 51, for example.

The next step is a matter of choice. The pair of sheets 52 and 54 can be in like fashion supported on chucks 13 and 14 and sealed to one another and then the two pairs of side walls arranged in juxtaposed relation for sealing between sheets 51 and 52 followed by replacing on the chucks to effect a seal between sheets 53 and 54, the lever 25 serving to assist in applying a lifting force to the depending side walls to reduce danger of warping or breakage.

Alternatively, after welding walls 51 and 53, sheet 53 can be transferred from chuck 14 to chuck 13 and the next sheet 54 held in position by chuck 14, as shown, while the lower edge of sheet 51 rests on the lever 25. Sheets 52 and 54 are welded to one another by an obviously similar procedure, it being understood of course that the preheating step preferably precedes each welding operation.

The completed side wall assembly of the tank is now placed on the structure of Fig. 3, the bottom wall 60 arranged on platen 36 as shown and the whole again preheated, after which the welding of one run of the edge of the bottom wall 60 to its adjoining side wall 53 is effected by the same procedure as followed in joining the side walls to one another. As will be appreciated, adjustable stops 43 and 44 are used only for holding the bottom wall in position while welding one edge thereof to a side wall. Furthermore, the use of the platen 36 and its associated parts may be dispensed with if desired by making the bottom wall 60 slightly larger than the inner dimensions of the side walls so that the bottom wall will rest on the inner edge of the side walls. Following each welding of an edge of the bottom to a side wall, the tank assembly is lifted from the support, given one quarter turn, replaced thereon and the preheating and welding operations repeated until all four edges of the bottom have been joined to their side walls. The completed tank is then preferably passed through a suitable annealing furnace so as to equalize the strain condition throughout the assembly or alternatively the tank may be heated to a suitable temperature and then tempered.

As will be appreciated, welding together of two glass sheets or panels, such as 71 and 72 (Fig. 5), may be carried out in the same manner as when two tank walls are welded to one another.

By the use of a piece of circular glass cane in the V formed between adjoining surfaces of glass parts to be welded to one another it will be observed, having patricular reference to Fig. 5, only a relatively small surface of the cane engages the glass parts to be joined and accordingly transmission of material heat to the parts and heat loss therefrom by conduction is prevented or at least materially restricted until the cane has been heated to a temperature at which it reaches a flowable condition. Once the cane slumps or flows into intimate surface contact with the glass parts, the heat is rapidly imparted to them and the weld effected without material penetration of the melting heat into the parts.

As previously mentioned, the cane may have a conductive coating or a series of coatings as illustrated in Fig. 6. As fully explained in the cited co-pending Guyer et al. application, by passing current through a conducting coating the adjacent glass is heated and becomes materially conducting before the conductive coating is destroyed and is thereafter heated to plasticity by the current passing therethrough. When the conductive coating is continuous, as in the above disclosure, the coating burns off progressively from the ends toward the center. This takes some time and results in temperature variation along the path which may lack perfection in uniformity of melting. It has since been discovered that by dividing this conductive coating into segments that miniature arcs occur between the respective segments when the row thereof is placed between the electrodes and that the transfer of heat to the glass is more rapid and uniform so that a better seal is made in less time than by the former method. Obviously, the use of a conductive coating divided into segments is also of utility applied to glass working operations taught by the above application.

If desired, the welding time can be further reduced by utilization of pieces of cane which have substantially the same expansion characteristics, but a lower softening temperature than that of the adjoining glass parts.

I claim:

1. The method which includes so arranging two similar pieces of glass that the parts to be joined are substantially only in line contact, arranging a third piece of glass in line contact with portions of the two pieces nearby their areas of line contact with one another, applying a series of closely spaced conductive coatings along a surface of the third piece of glass out of contact with the other pieces, including said third piece of glass and the series of coatings in parallel paths between a pair of electrodes, and applying heating potential to the electrodes as required to burn off the conductive coatings so as to heat the third piece of glass to conductivity and continuing application of the potential to melt and weld said third piece to said first two pieces by the Joule effect.

2. The method of heating a path along a glass body to melting temperature, which includes arranging a row of closely spaced conductive coatings along the path, applying electrodes to the end coatings, supplying heating potential to the electrodes to first burn off the conductive coatings substantially simultaneously to heat the adjoining glass to a conductive temperature and continuing the application of heating potential to the electrodes until the glass has reached a desired temperature.

3. The method of heating a piece of glass along a desired path, which includes applying segments of electrically conductive and readily dissipated material in slightly spaced relation on the glass along the path, associating electrodes with the end ones of said segments and with the adjoining glass, applying a heating potential to the electrodes to simultaneously burn away all segments and thus quickly heat the glass along the entire path to substantially the same electrical conductivity and continuing the application of heating potential to heat the glass in the path by the Joule effect to the desired temperature.

4. The method of heating a strip of glass, which includes applying a series of closely spaced readily dissipated conductive coatings along the strip, including the series of conductive coatings and the strip in parallel circuits between a pair of electrodes and supplying the electrodes with an electrical potential of a character suitable for initially heating the strip by passing current through the coatings until they are dissipated and through the strip as it reaches a conducting temperature during and after the dissipation of said coatings.

5. The method of welding together two glass parts which includes arranging and holding the respective parts in a desired juxtaposed relation, arranging a piece of glass cane along the oppositely disposed edges of the parts, applying a series of spaced conductive coatings on the surface of the cane along its length and passing an electric current through the conductive coatings to heat the cane to a readily conductive temperature so that by the subsequent Joule effect the cane melts and flows into intimate contact with the respective parts.

6. The method of welding together two pieces of glass, which includes arranging the pieces alongside one another in the desired juxtaposed relation, supporting a third piece of glass on portions of said two pieces near one another when the two pieces are in such juxtaposed relation, applying a series of closely spaced conductive coatings along a surface of the third piece and passing electric heating current first through said conductive coatings and then through the auxiliary piece of glass until it melts and flows into intimate contact with the two pieces.

7. The method of welding together two pieces of glass, which includes arranging the pieces adjacent one another in a desired juxtaposed relation, supporting a third piece of glass on portions of said two pieces which are near one another when the two pieces are in such juxtaposed relation, applying a series of closely spaced conductive coatings along a surface of the third piece of glass, including said third piece of glass and the series of coatings in parallel paths between a pair of electrodes, and applying heating potential to the electrodes as required to burn off the conductive coatings so as to heat the third piece of glass to conductivity and continuing application of the potential to melt and weld said third piece to said first two pieces by the Joule effect.

8. The method of welding together two pieces of glass, which includes arranging and holding the respective pieces in a desired juxtaposed relation, arranging on portions of said two pieces a third piece of glass having a series of spaced conductive coatings on its surface in a row alongside the desired line of juncture of the two pieces, and passing an electric current through the conductive coatings to heat the third piece to a readily conductive temperature so that by the subsequent Joule effect the third piece melts and flows into intimate contact with the first two pieces.

9. The method of welding one piece of glass to another, which includes arranging the two pieces in abutting relation along their desired line of juncture, one of said pieces having a series of spaced conductive coatings thereon in a row alongside the desired line of juncture, and passing an electric current through the conductive coatings to heat said one piece to a readily conductive temperature so that by the subsequent Joule effect it melts and intimately unites with the other piece.

MORTON R. SHAW, Jr.

REFERENCES CITED

The following references are of record in the file of this patent:

UNITED STATES PATENTS

| Number | Name | Date |
| --- | --- | --- |
| 499,082 | Armstrong | June 6, 1893 |
| 1,194,124 | Barrow | Aug. 8, 1916 |
| 2,119,680 | Long | June 7, 1938 |
| 2,193,393 | Danner | Mar. 12, 1940 |
| 2,306,054 | Guyer | Dec. 22, 1942 |
| 2,389,360 | Guyer et al. | Nov. 20, 1945 |

FOREIGN PATENTS

| Number | Country | Date |
| --- | --- | --- |
| 15,303 | Great Britain | 1884 |
| 25,756 | Great Britain | Dec. 17, 1901 |
| 391,245 | Germany | Mar. 1, 1924 |